March 25, 1930.   C. R. RANEY ET AL   1,751,601
GRAIN TANK FOR HARVESTER THRASHERS
Filed June 21, 1926   3 Sheets-Sheet 2

Inventors,
C. R. Raney
and A. E. W. Johnson,
By N. P. Derrick
Atty.

March 25, 1930.   C. R. RANEY ET AL   1,751,601
GRAIN TANK FOR HARVESTER THRASHERS
Filed June 21, 1926   3 Sheets-Sheet 3
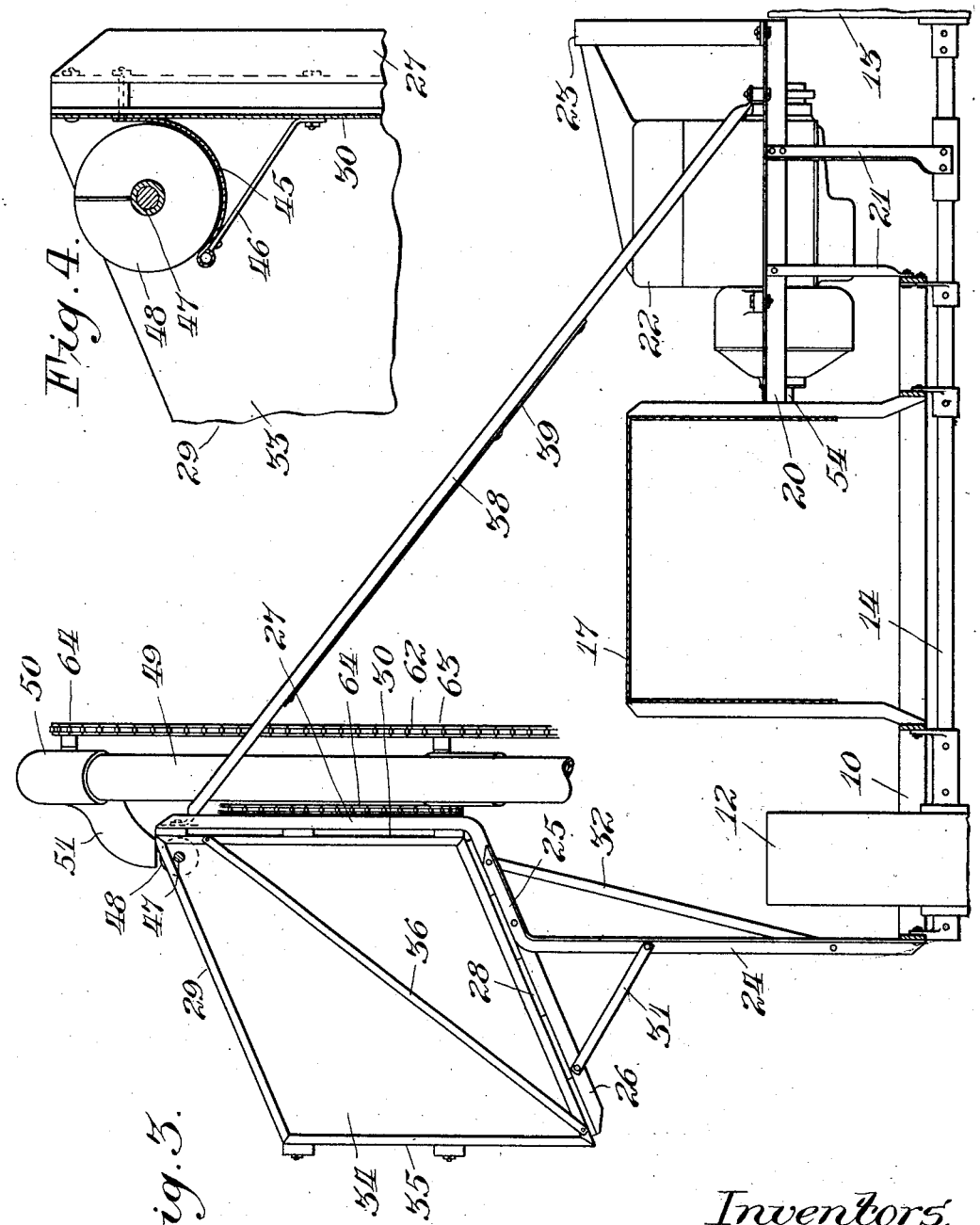

Patented Mar. 25, 1930

1,751,601

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY

GRAIN TANK FOR HARVESTER THRASHERS

Application filed June 21, 1926. Serial No. 117,354.

This invention relates to harvester thrashers and especially to a novel mechanism for storing and transporting grain while the machine is in operation, such mechanism being in the form of a storage tank or bin, which is mounted upon the harvester thrasher frame, the same receiving the grain from the thrasher.

In the use of harvester thrashers it is now a common practice to employ a grain receiving and storing bin, or, as it is to be hereinafter called, a grain tank. In the past these tanks have been mounted low on the machine frame because of the great weight which they add to the machine when entirely or even partly loaded, the capacity of such tanks usually running from 50 to 60 bushels. With the tank mounted low on the frame as stated, the use of a mechanical discharging mechanism became necessary to remove the grain therefrom and elevate it into a barge or a wagon box. The use of such unloading mechanism, of course, added materially to the expense of these machines.

In the grain tank of the present invention applicants have overcome the necessity for employment of a tank unloading or discharging mechanism by positioning the tank high on the machine frame and providing the same with an inclined bottom, so that upon opening of small trap doors the grain will automatically discharge itself from the bin and flow into a barge or wagon standing alongside thereof. In placing the bin relatively high on the machine and because of its weight when loaded with 50 or 60 bushels of grain, certain problems were encountered with respect to the even distribution of this weight over the machine frame. Applicants have overcome any objection to this high disposition of the tank and its load by providing a novel supporting means for evenly distributing its weight on the machine frame.

Another problem encountered in the past was due to the fact that the grain in being discharged by means of a spout from the thrashing mechanism into the tank was usually not evenly distributed in the tank, and, as a result, the full potential capacity of the tank could not be utilized. In the present invention applicants also overcome this difficulty.

With this general statement of the problems heretofore encountered in prior constructions, it is the main object of this invention to provide a novel form of grain tank disposed on a harvester thrasher frame in such a manner and by such means that its weight, when empty or loaded, will be evenly distributed on the machine frame.

Another object of this invention is to provide a leveling mechanism for evenly distributing the load in the grain tank.

Other objects should be apparent to those skilled in this art as the description progresses.

As is well known, these harvester thrashers comprise a main frame having its front end supported by a pilot or steering tongue truck, while its rear end is supported by a main wheel and a grain wheel. With this structure for a foundation the objects of this invention are briefly accomplished by providing a grain tank having a sloping bottom, said tank being carried on vertically disposed uprights on the frame for positioning the tank substantially above the main wheel. For distributing its great weight, a brace extends from the tank forwardly to the main frame at a point adjacent the tongue truck, and laterally therefrom extends a trussed brace structure which is made fast on the main frame adjacent the grain wheel. This supporting and bracing structure, thus in effect, forms a tripod or three-point suspension for the grain tank. A trough is provided inside of the tank and this trough receives the grain from the thrashing mechanism, said trough being provided with a screw feeding mechanism for moving the grain along the length of the tank evenly to distribute the same within the tank, thereby effectually permitting use of the entire capacity of the tank. When the tank is full, a trap door at its lower end may be opened and the grain automatically discharges into a barge or wagon standing alongside, because of the tank's inclined bottom.

Reference should now be made to the accompanying sheets of drawings, like characters of reference being used to designate like parts throughout the several views, and wherein it is to be understood there is shown an illustrative embodiment which this invention may assume in practice.

In these drawings:

Figure 3 is a rear elevational view of a part of the harvester thrasher; and

Figure 4 is a detail sectional view taken along the line 4—4 of Figure 1, looking through the leveling mechanism in the grain tank.

Figure 1:
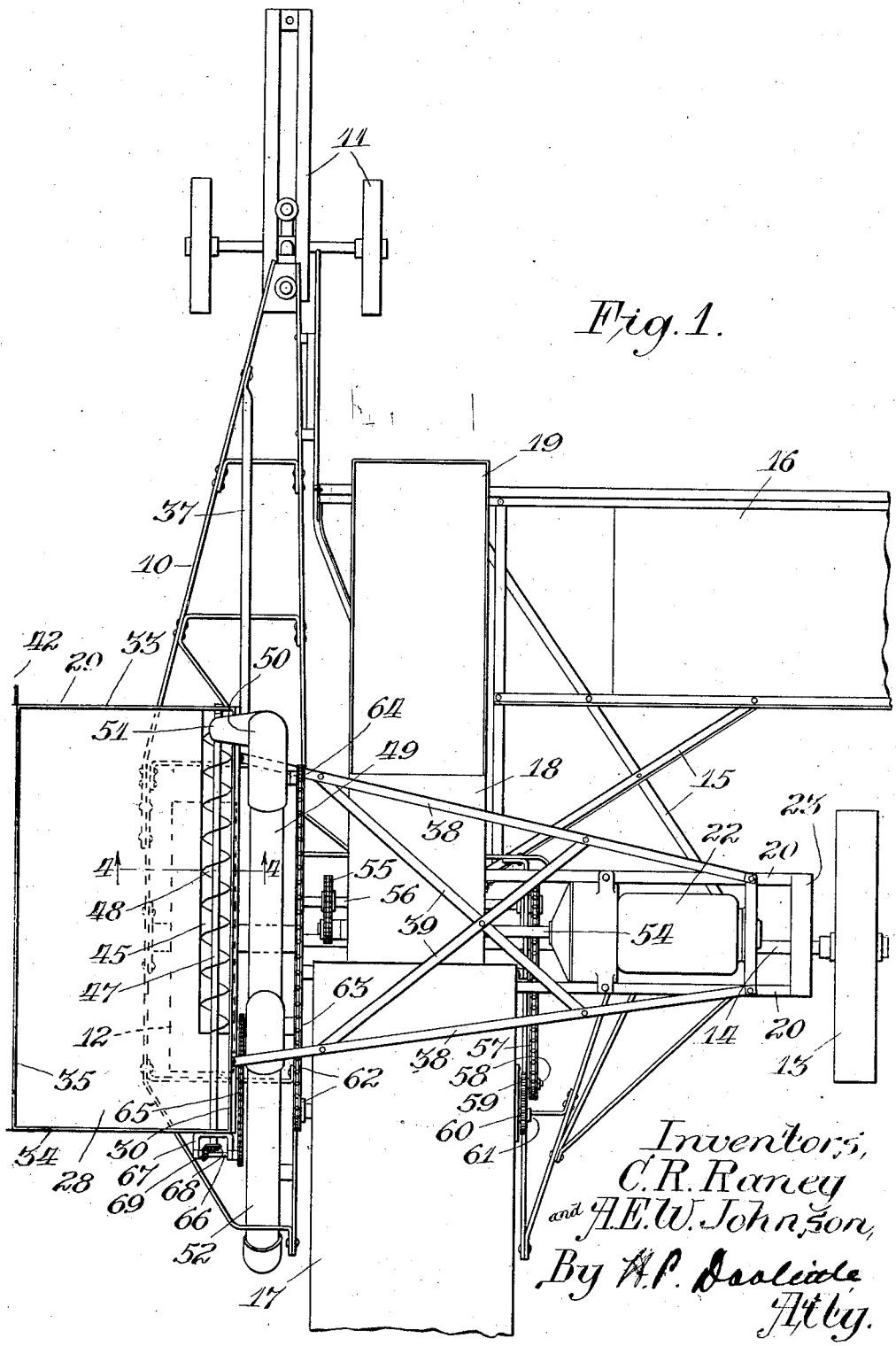
Figure 1 is a plan view of a harvester thrasher showing the improved tank in position thereon with the operative connections from the thrasher to the tank for driving its grain leveling mechanism.

In the drawings there is illustrated a harvester thrasher having a main frame 10 the forward end of which is supported by a pilot or steering tongue truck 11. Its rear stubbleward end is supported on a main wheel 12, and its rear grainward end, by a grain wheel 13, the wheels conventionally carrying an axle 14 to which the frame is secured in any suitable fashion, as will be readily understood. By means of crossed beams 15 the axle conventionally carries a harvester cutting platform 16, the connection of these beams to the axle being not shown, as it is unnecessary in connection with this invention and, furthermore, it is well known in this art.

Along the longitudinal median line of the frame it will be seen that the same carries in any suitable fashion a separator housing 17 of a thrasher. Forwardly thereof and in line therewith is a thrasher cylinder housing 18, which, of course, communicates with the separator 17, as is well known, and forwardly of the thrashing cylinder housing 18 and in communication therewith is a feeder housing 19 which it will be observed in Figures 1 and 2 rests on the frame structure supporting the platform 16.

Laterally in a grainward direction from the thrashing cylinder housing 18 the main frame carries two spaced frame members 20, which are supported above the main frame and axle 14 by means of uprights 21, as shown in Figure 3. These spaced frame members 20, which are in parallelism, support an engine 22 and a radiator 23 therefor for a purpose presently to be made known.

As stated at the start of this specification, it is common practice to employ a grain tank disposed on the main frame for receiving the grain from the separating mechanism within the housing 17, and it is the object of this invention to provide such a tank disposed relatively high on the frame, and, by means of suitable supporting members therefor, to overcome any tendency of top-heaviness and lack of proper weight distribution. This improved grain tank and its supports will now be described.

Figure 2:
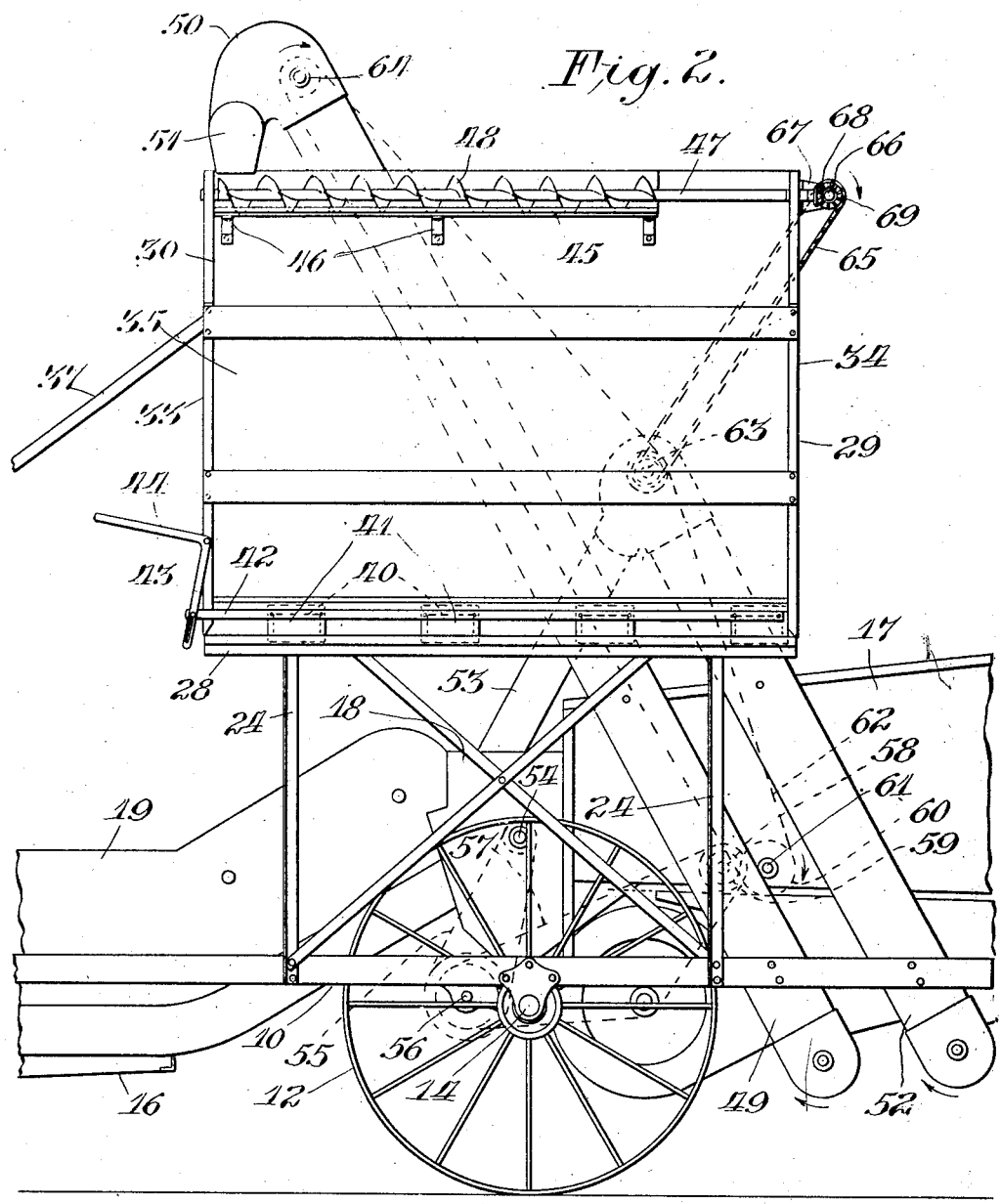
Figure 2 is a side elevational view of the central portion of the harvester thrasher upon which is mounted the grain tank.

Viewing Figures 2 and 3 particularly, it will be seen that upright supporting bars 24 extend vertically from the main frame 10 and that, as shown in Figures 3, these bars are made of angle irons and rise substantially above the top of the separating housing 17. These bars, it will be seen, are fast to the main frame at the outside of the main wheel 12 and at their upper ends are bent and inclined inwardly and upwardly, as shown at 25. These inclined portions 25 have secured thereto other angle irons which form a tank supporting floor frame member 26 and a rear wall supporting frame member 27. The frame portion 26 supports the floor 28 of the grain tank indicated generally at 29, and the frame portion 27 supports the rear wall 30. Any suitable form of braces 31 and 32 may be provided better to support the tank on the uprights 24. It will be noted that the floor 28 of the tank is inclined and extends stubblewardly and downwardly about half of its width beyond the supports 24. The tank, of course, is in the form of a rectangular box having the floor 28, as already stated, and the rear wall 30. It furthermore has end walls 33, 34, and a front wall 35, the top of the tank being open. The box part of the tank may be strengthened by a cross brace 36 preferably diagonally arranged, as shown.

This tank is intended to store and transport 50 to 60 bushels of grain, and, as this is a considerable load, it becomes necessary to provide means for evenly distributing the weight of this load. For this purpose, the rear wall of the grain tank has fastened thereto a brace 37, which extends longitudinally forwardly and is made fast to the main frame 10 adjacent the tongue truck 11. Near the front end of the rear wall 30 of the tank and near the rear end of this wall, there is made fast to the tank a pair of laterally, or grainwardly, extending braces 38, which converge toward one another and are made fast to the frame pieces 20 which support the engine 22. It will be observed that this connection of these braces is made to the frame adjacent the grain wheel 13. Cross braces 39 are provided for trussing and strengthening the braces 38. This trussed bracing structure is made fast to the rear wall of the tank near its upper end, the same extending over the separator housing 17 and thrashing cylinder housing 18.

From this detailed description it will now be seen that the vertical supports 24 in combination with the forwardly extending brace 37 and the laterally extending braces 38 form in effect a three-point or tripod suspension for the grain tank, and, through these members, evenly distribute its great weight on the main frame at those points, to-wit, at the main wheel, at the grain wheel, and at the tongue truck, where the frame is best adapted to receive the thrust of this load.

The front wall 35 of the grain tank at its lower end is provided with discharge openings 40 each of which is covered by a door 41, the doors being carried on a slide bar 42 which has one free end slidably connected to the end of one arm 43 of a bell crank lever 44. Obviously then, if it is desired to discharge the contents of the grain tank, it is merely necessary to manipulate the bell crank 44 which is pivoted to the grain tank and, as a result, the slide bar 42 will be actuated to remove the doors 41 from the openings 40, and then by gravity, due to the inclined bottom of the tank, the contents thereof will automatically be discharged and may be dropped into a barge or wagon positioned alongside the harvester thrasher underneath the grain tank.

As stated at the start of this specification it was mentioned that difficulty had been encountered in the past with grain tanks because no means was provided for evenly distributing the grain throughout the tank, so that its entire capacity might be utilized. It will also be recalled that it was an object of this invention to overcome this difficulty. This mechanism will now be described.

The upper inner edge of the rear wall 30 of the grain tank carries a trough 45, one edge of the trough being made fast to the rear wall and the other edge being supported by brackets 46. As shown in Figure 2, it will be seen that the trough extends throughout substantially the entire length of the rear wall of the tank. Journaled in the end walls of the tank for rotation is a shaft 47 which passes over the trough and carries thereon a screw feeding mechanism in the form of an auger 48.

It is well known that in thrashing machines and in harvester thrashers that the greater percentage of grain is separated from the straw at the thrashing cylinder in the housing 18 and that it is unnecessary for this separated grain to pass through all of the separating mechanism within the separator 17. It is customary, therefore, to provide, just rearwardly of the point where the thrashing cylinder housing communicates with the separator housing, an inclined elevator 49, which receives the thrashed grain from the separator and elevates it, by any suitable form of conveying mechanism, upwardly to a discharge spout or elbow 50, which has a stubblewardly bent extension 51 discharging into one end of the trough 45 in the grain bin. That portion of the grain which is not completely separated from the straw at the thrashing cylinder and the mechanism just therebeyond, must be carried through the separating elements in the housing 17 rearwardly beyond the elevating mechanism 49 where it is separated and is caught by a supplementary mechanism 52 in the form of an elevator which carries the grain and chaff upwardly and discharges the same into a spout 53 in communication with the cylinder housing 18, and, as a result, this grain must be passed for further separation into the separator again where it is caught by the elevator 49 and thus discharged from the thrasher to the grain bin, as has already been described. The driving connections for all of this mechanism will be briefly described.

It is to be understood that all of this mechanism is driven from the engine 22 and, in this connection, it is to be seen that the engine has its crank shaft, indicated at 54, extended into the housing 18, the same carrying inside of the housing the usual thrashing cylinder, not shown. This shaft 54 extends through the opposite or stubbleward end of the housing 18 and is provided with a chain and sprocket connection 55 to a shaft 56, which passes underneath the housing and back to the grainward end thereof where the same has a sprocket and chain connection 57 to a shaft 58 journaled in the separator housing 17. The shaft 58 carries a gear 59 meshing with a gear 60 on a shaft 61, also journaled in the separator housing, the shaft 61 extending through the housing where, at its stubbleward end, it has a sprocket and chain connection 62, said chain connection 62 rotating a shaft 63 in the upper end of the elevator 52 and also a shaft 64 in the upper end of the elevator 49, or better, in the elbow 50. It will thus be seen that the single chain connection 62 is used to drive the conveying mechanisms within both elevators 49 and 52. All of this driving mechanism just described forms no particular part of the present invention except in so far as it is necessary to carry the same through for driving the feeding and leveling mechanism in the grain tank.

It will be seen that the shaft 63 extends through the upper part of the elevator 52 and that at its stubbleward end it has a sprocket and chain connection 65 with a shaft 66 journaled in a bracket 67, made fast to the rear wall 34 of the grain tank adjacent the shaft 47, which is additionally journaled in the bracket just mentioned. The end of the shaft 47, which protrudes through the wall 34 and bracket 67, is provided with a bevel pinion 68 which meshes with a bevel gear 69 on the shaft 66, thus completing the driving connection to the moving parts of the thrashing mechanism.

A summary of the operation of this mechanism is now in order.

The platform 16 receives the harvested grain and moves it conventionally into the feeder housing 19 where it goes into the cylinder 18 and separator 17 and thence is elevated by the elevator 49 which conveys the thrashed grain to the forward end of the trough 45 made fast to the rear wall of the grain tank. This grain tank is supported high on the machine frame and, in fact, well above a plane passing through the top of the separator or thrasher. A novel three-point suspension is provided for the tank evenly to distribute the weight thereof on the frame. Through the gearing connections described, the shaft 47 is rotated and, as a result, the auger, or screw, 48 feeds the material along the trough and pushes it over its edge evenly from end to end thereof, thus depositing a level load into all parts of the grain tank. When the tank is filled to capacity, the harvester thrasher may be stopped and a barge will be pulled therealongside underneath the tank. The operator then manipulates the bell crank 44 to remove the doors from the openings 40, and because of the inclined bottom of the tank, the grain automatically discharges itself into the barge. Of course, it will be understood that it is not necessary to stop the harvester thrasher, because obviously the tank could be unloaded while the same is in motion. From this detailed description it will be seen that the illustrative embodiment herein shown attains all of the very desirable objects recited at the beginning of this specification and that the same will perform efficiently and can be put to practical use in the field.

It is, of course, to be understood that the embodiment of the invention herein disclosed is capable of many changes and rearrangement of parts and that it is the intention herein to cover all such changes as fall within the spirit and scope of this invention as is indicated in the appended claims.

What we claim is:

1. In a harvester thrasher having a frame supported on main, grain, and steering wheels, the combination of a grain tank having a sloping bottom carried by the frame above the main wheel by upwardly extending supports which intermediately of their lengths are inclined to form a rest for the sloping bottom of the tank.

2. In a harvester thrasher having a frame supported on main, grain, and steering wheels, the combination of a grain tank having a sloping bottom carried by the frame above the main wheel by upwardly extending supports which intermediately of their lengths are inclined to form a rest for the sloping bottom of the tank, and braces extending from the tank to the frame adjacent the steering and grain wheels.

3. In a harvester thrasher, the combination of a frame supported on a main wheel, a grain wheel and a front steering truck, an elevated, gravity discharge, grain tank carried above the main wheel with the outer face of the tank set out laterally of the vertical plane passing through the outer face of said wheel, whereby a wagon is enabled to pass under the tank to receive its contents, and means for supporting the tank on the frame in a manner to distribute its weight on each of said wheels and steering truck.

4. In a harvester thrasher, the combination of a frame supported on a main wheel, a grain wheel and a front steering truck, an elevated, gravity discharge, grain tank carried above the main wheel with the outer face of the tank set out laterally of the vertical plane passing through the outer face of said wheel, whereby a wagon is enabled to pass under the tank to receive its contents, and a three-point support for the tank for distributing its weight on each of the said wheels and truck.

In testimony whereof we affix our signatures.

CLEMMA R. RANEY.
ARNOLD E. W. JOHNSON.